United States Patent
Motin et al.

(10) Patent No.: US 10,933,738 B2
(45) Date of Patent: Mar. 2, 2021

(54) METHODS AND SYSTEM FOR A ZERO HYSTERESIS VALVE

(71) Applicant: Ford Global Technologies, LLC, Dearborn, MI (US)

(72) Inventors: Abdul Motin, Canton, MI (US); Chin-Yuan Perng, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 194 days.

(21) Appl. No.: 16/040,315

(22) Filed: Jul. 19, 2018

(65) Prior Publication Data
US 2020/0023729 A1 Jan. 23, 2020

(51) Int. Cl.
| | |
|---|---|
| *B60K 15/035* | (2006.01) |
| *F16K 17/04* | (2006.01) |
| *F16K 15/02* | (2006.01) |
| *F16K 17/08* | (2006.01) |
| *F16K 25/00* | (2006.01) |
| *B60K 15/03* | (2006.01) |

(52) U.S. Cl.
CPC ...... *B60K 15/03519* (2013.01); *F16K 15/025* (2013.01); *F16K 17/0466* (2013.01); *F16K 17/082* (2013.01); *B60K 2015/03296* (2013.01); *B60K 2015/03585* (2013.01); *F16K 25/00* (2013.01); *Y10T 137/7925* (2015.04)

(58) Field of Classification Search
CPC .... B60K 15/03519; B60K 2015/03296; B60K 2015/03585; F16K 15/025; F16K 17/082; F16K 25/00; F15K 17/0466; Y10T 137/7925

USPC .................................................. 251/333
See application file for complete search history.

(56) References Cited

U.S. PATENT DOCUMENTS

| | | | | | |
|---|---|---|---|---|---|
| 1,879,020 | A | * | 9/1932 | Balsiger | F16K 3/24 137/538 |
| 1,891,119 | A | * | 12/1932 | Stover | F16K 17/042 137/467 |
| 2,005,813 | A | * | 6/1935 | Thorsen | G05D 16/103 137/494 |
| 2,011,333 | A | * | 8/1935 | Clifton | F16K 17/0433 137/538 |
| 2,594,626 | A | * | 4/1952 | Earle | F16K 17/082 137/473 |
| 2,633,147 | A | * | 3/1953 | Badami | B60T 11/326 137/506 |
| 4,171,712 | A | * | 10/1979 | DeForrest | F16K 17/196 137/513.5 |
| 4,742,846 | A | | 5/1988 | DiBartolo | |

(Continued)

FOREIGN PATENT DOCUMENTS

| | | | | |
|---|---|---|---|---|
| CN | 103291679 A | | 9/2013 | |
| DE | 102007031306 A1 | * | 1/2009 | ............ F16K 1/42 |

(Continued)

*Primary Examiner* — Marina A Tietjen
*Assistant Examiner* — Frederick D Soski
(74) *Attorney, Agent, or Firm* — Geoffrey Brumbaugh McCoy Russell LLP (57) ABSTRACT

Methods and systems are provided for a zero hysteresis valve. In one example, a valve comprises protrusions shaped to maintain a distance between a moveable portion of the valve and a valve seat.

17 Claims, 3 Drawing Sheets

(56) References Cited

U.S. PATENT DOCUMENTS

| | | | | |
|---|---|---|---|---|
| 4,874,066 A * | 10/1989 | Silberstein | ............... | F16F 9/512 |
| | | | | 188/280 |
| 5,168,895 A * | 12/1992 | Voss | ...................... | F16K 17/046 |
| | | | | 137/494 |
| 5,215,116 A * | 6/1993 | Voss | ...................... | F16K 17/04 |
| | | | | 137/494 |
| 5,241,986 A * | 9/1993 | Yie | ...................... | B05B 1/306 |
| | | | | 137/512 |
| 5,253,668 A | 10/1993 | Mills | | |
| 5,390,698 A * | 2/1995 | Frazzini | .................. | F16K 15/02 |
| | | | | 137/496 |
| 6,352,085 B1 * | 3/2002 | Morita | ..................... | F01M 1/20 |
| | | | | 137/516.27 |
| 6,460,561 B1 | 10/2002 | Ebinger | | |
| 8,127,791 B2 | 3/2012 | Najmolhoda et al. | | |
| 8,739,820 B1 * | 6/2014 | Theobald | ............... | F16K 17/06 |
| | | | | 137/524 |
| 9,670,914 B2 * | 6/2017 | Kumazawa | ............ | F04B 1/182 |
| 10,612,495 B2 * | 4/2020 | Fukui | ................. | F02M 25/0854 |
| 2005/0072476 A1 * | 4/2005 | Neto | ........................ | F01P 3/08 |
| | | | | 137/539 |
| 2008/0206078 A1 * | 8/2008 | Yamamoto | ............. | F04C 2/102 |
| | | | | 417/410.4 |
| 2008/0223460 A1 * | 9/2008 | Pecheny | ............... | F16K 15/025 |
| | | | | 137/543.19 |
| 2009/0145487 A1 * | 6/2009 | Holden | ................. | F16K 15/025 |
| | | | | 137/315.04 |
| 2010/0078085 A1 * | 4/2010 | Kurokawa | ......... | F16K 17/0473 |
| | | | | 137/528 |
| 2010/0096028 A1 * | 4/2010 | Qiu | ...................... | F16K 15/026 |
| | | | | 137/538 |
| 2013/0233413 A1 * | 9/2013 | Williamson | ......... | F16K 15/025 |
| | | | | 137/538 |
| 2014/0116541 A1 * | 5/2014 | Jang | ........................ | F01M 1/16 |
| | | | | 137/538 |
| 2015/0001431 A1 * | 1/2015 | Danzy | ................ | F16K 31/1223 |
| | | | | 251/324 |
| 2015/0198257 A1 * | 7/2015 | Kelm | .................. | F04B 27/1804 |
| | | | | 137/512 |
| 2016/0115845 A1 * | 4/2016 | Fujita | ....................... | F16K 1/42 |
| | | | | 251/318 |
| 2017/0137022 A1 * | 5/2017 | Dudar | ..................... | F02D 15/00 |
| 2017/0307462 A1 * | 10/2017 | Barron | ................. | F16K 15/025 |
| 2017/0328316 A1 * | 11/2017 | Van Lant | ......... | F02M 35/10255 |

FOREIGN PATENT DOCUMENTS

| | | |
|---|---|---|
| DE | 102011083189 A1 | 4/2012 |
| DE | 102014015559 A1 | 4/2016 |

\* cited by examiner

METHODS AND SYSTEM FOR A ZERO HYSTERESIS VALVE

FIELD

The present description relates generally to one or more features and inlet and outlet sizes to provide zero hysteresis between valve opening and closing.

BACKGROUND/SUMMARY

Various types of valves may be used to adjust gas and liquid flow from one compartment of a vehicle to another. As one example, a valve may be shaped to adjust fuel vapor flow from a fuel vapor canister of a fuel system to a manifold of an engine. However, the valve, and other similar valves, or check valves that open and close in response to a pressure, may open and close abruptly. The sudden increase or decrease in fuel vapor may result in undesired engine operating conditions (e.g., "stumble").

Further, attempts to address valve hysteresis include various approach such as a two-stage flow. One example approach is shown by Mills in U.S. Pat. No. 5,253,668. Therein, a low-hysteresis, pressure operated ball head valve comprises radial vents and a small bleed orifice. Below a specified pressure, the ball rests on a valve seat to close all but the bleed orifice. When a vapor pressure in a fuel tank reaches a predetermined pressure, the ball lifts smoothly off the valve seat to increase the volume of flow.

The inventors herein have recognized the above issues as well as interrelations there between, as well as potential issues with such systems as in Mills. As one example, when pressure is decreased, a decreasing flow curve tracks the increasing flow curve with still some hysteresis. This hysteresis may result in a cacophony of noises emanating from a location of the valve, which may be audible to one or more vehicle occupants. As another example, the ball valve shown by Mills does not decrease hysteresis in piston valves experiencing similar issues.

Some valves may utilize electromagnetic or external control modules to eliminate or significantly mitigate hysteresis. However, these valves increase manufacturing costs and may be prone to degradation. Furthermore, hysteresis may be mitigated by increasing a ratio of an opening port diameter to a valve piston diameter. However, increasing the ratio to a ratio such that hysteresis is eliminated may not be possible. A complete elimination of hysteresis may be possible only when an opening port diameter is equal to a piston diameter which is impractical. This may be due to a certain valve seat area being needed to hold the piston in the housing at closed position. This valve seat area creates a differential active hydraulic area on a piston face when the valve is between closed and open positions, which thereby yields hysteresis. In addition, if the valve seat area is very small compared to the piston face area then a mechanical stress concentration above a desired threshold may occur on a piston edge as well as valve seat edge, which thereby results degradation. As such, a demand for a zero-hysteresis valve passively operated that may not induce parasitic energy losses still exists.

In one example, the issues described above may be addressed by a valve comprising a piston shaped to oscillate within a valve housing, wherein a protrusion is physically coupled to the piston and shaped to prevent the piston from moving within a threshold distance of a valve seat. In this way, an area of the piston to which pressure may be applied may be uniform in a closed and an open position.

As one example, the protrusion further comprises gaps shaped to distribute incoming pressure evenly across the surface of the piston. Furthermore, the valve housing comprises at least two outlets arranged on opposite sides which may further contribute to the even distribution of pressure across the piston surface. By doing this, hysteresis between open and closed position of the valve may be eliminated, resulting in smoother and more predictable operation of the valve.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-4 are shown approximately to scale, although other relative dimensions may be used, if desired.

DETAILED DESCRIPTION

Figure 1:
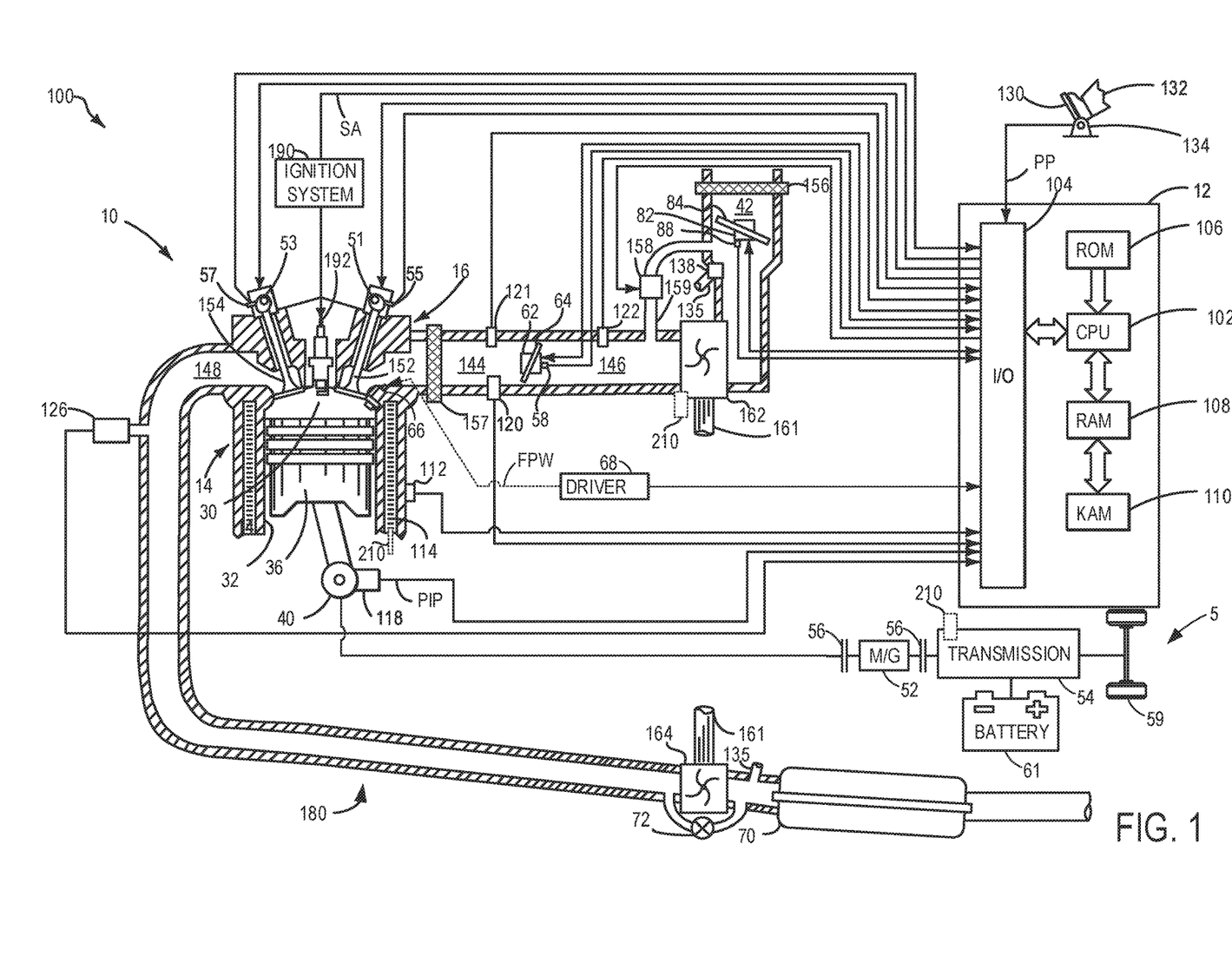
FIG. 1 illustrates a schematic of an engine included in a hybrid vehicle.

The following description relates to systems and methods for decreasing hysteresis in a valve to a threshold hysteresis. In one example, the threshold hysteresis is zero. The valve may be a piston or ball valve shaped to adjust in response to one or more engine operating parameters of an engine included in a hybrid vehicle as shown in FIG. 1.

Figure 2A:
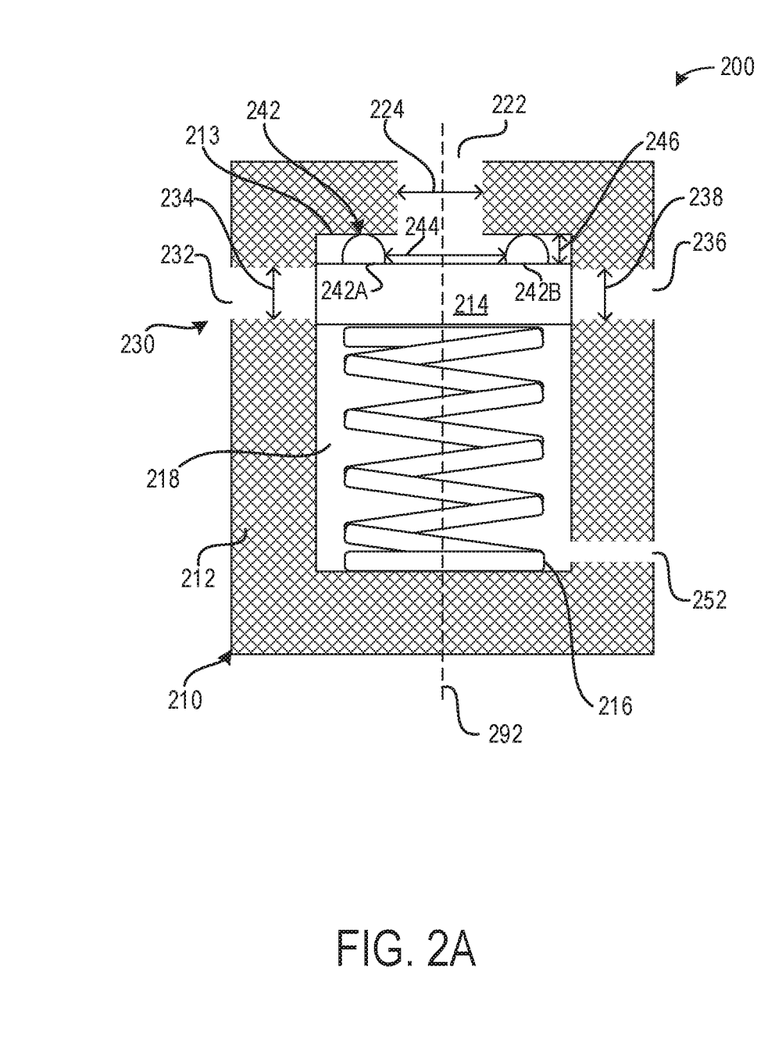
FIGS. 2A and 2B show closed and open positions of the zero-hysteresis valve, respectively.
Figure 2B:
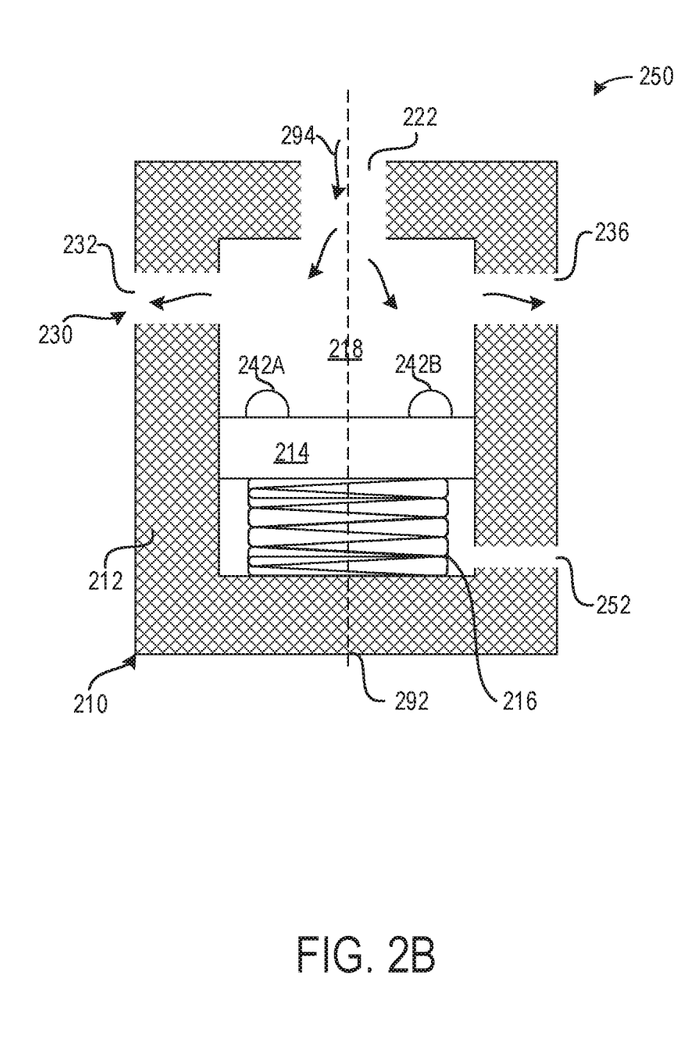

The zero-hysteresis valve may be actuated to a closed or an open position, as shown in FIGS. 2A and 2B. In some examples, the zero-hysteresis valve may function similarly to a check valve, wherein the actuation of the valve is in response to a pressure, temperature, or the like. The valve may comprise sized openings functioning as one or more of inlets and outlets based on various engine operating parameters. In the examples of FIGS. 2A and 2B, the valve comprises one inlet and two outlets, the outlets arranged diametrically across from one another.

Figures 3A, 3B:
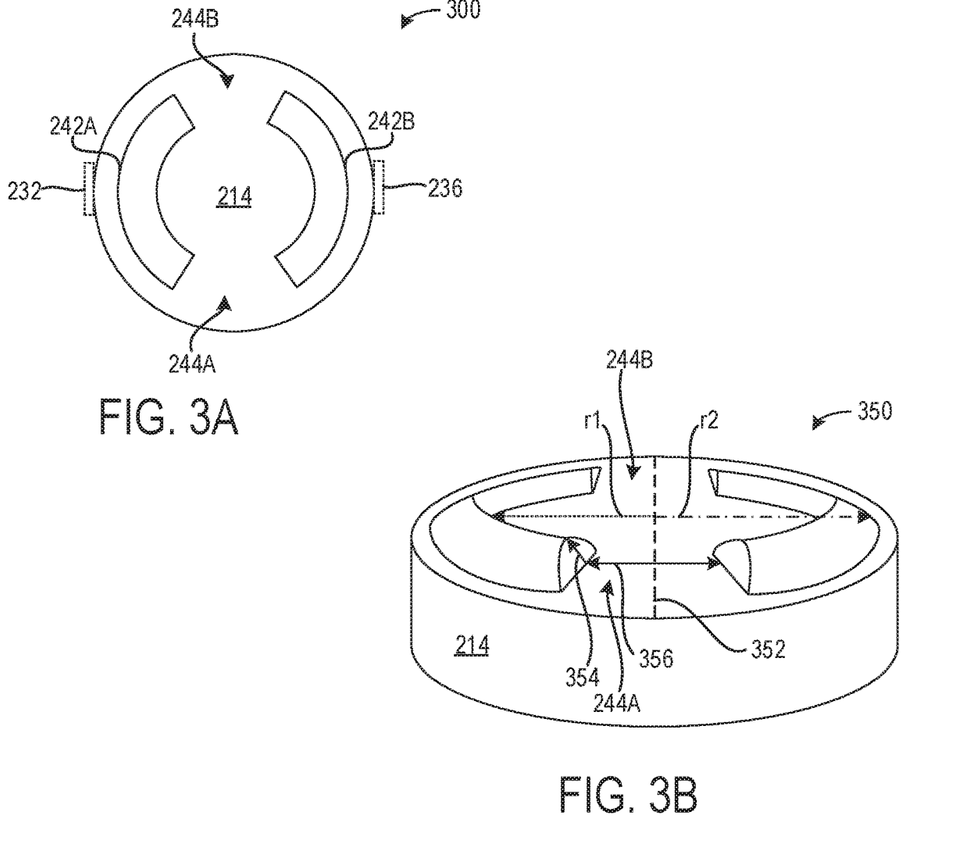
FIG. 3A shows a top-down view of a protrusion arranged on top a moving portion of the valve.
FIG. 3B shows a perspective view of the protruding feature arranged on top the moving portion of the valve.
Figure 4:
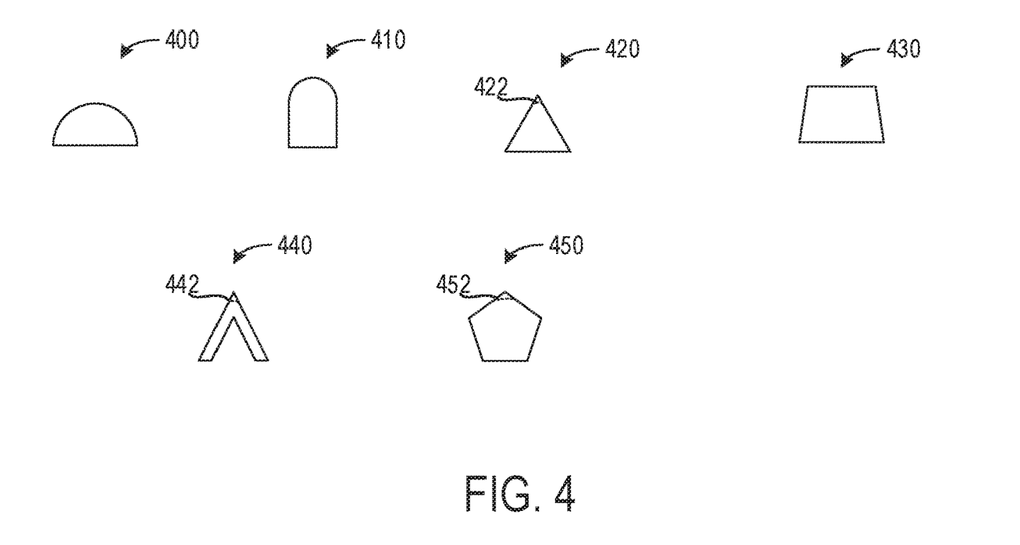
FIG. 4 shows various optional cross-sectional shapes of the protrusion.

A moveable portion of the valve may comprise a feature thereon. A top-down view of the moveable portion is shown in FIG. 3A. A perspective view of the moveable portion further illustrating the feature is illustrated in FIG. 3B. The feature may comprise a variety of shapes, wherein a variety of cross-sections of the feature are shown in FIG. 4.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Note that FIG. 2B shows arrows indicating where there is space for gas to flow, and the solid lines of the device walls show where flow is blocked and communication is not possible due to the lack of fluidic communication created by the device walls spanning from one point to another. The walls create separation between regions, except for openings in the wall which allow for the described fluid communication.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore 20, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36.

Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressure can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 59. Electric machine 52 may also be operated as a generator to provide electrical power to charge battery 58, for example during a braking operation.

The controller 12 receives signals from the various sensors of FIG. 1 and employs the various actuators of FIG. 1 to adjust engine operation based on the received signals and instructions stored on a memory of the controller. For example, adjusting operation of the electric machine 52 may occur based on feedback from ECT sensor 112.

The vehicle 5 may further include a valve 210 arranged in one or more locations of the engine system 100, the transmission 54, a drivetrain, or other area. More specifically, the valve 210 may be fluidly coupled to cooling passages of the compressor 162 and may be shaped to flow coolant to the cooling passages. Another instance of the valve 210 may be fluidly coupled to the cooling sleeve 114 to adjust coolant flow to or from the cooling sleeve. Additionally or alternatively, the valve 210 may be arranged in a location similar to a fuel canister purge valve, as is known by those of ordinary skill in the art. The valve 210 is described in greater detail below.

Turning now to FIGS. 2A and 2B, they show embodiments 200 and 250 of the valve 210 arranged in a closed position and an open position, respectively. The valve 210 may be arranged in one or more of an engine system, transmission system, driveline, and other hydraulic system of the vehicle (e.g., vehicle 5 of FIG. 1) and may be shaped to adjust a flow of a fluid, wherein the fluid may be a gas, a liquid, a liquid with some amount of solid matter arranged therein, and/or a combination thereof.

The valve 210 may comprise a valve housing 212 with a moveable portion 214 coupled to a spring 216 arranged therein. Herein, the moveable portion 214 is a piston 214, and the valve 210 is a piston valve. However, it will be appreciated that the features described herein shaped to decrease hysteresis between opening and closing the valve 210 may also be applied to a ball-type valve.

In FIG. 2A, the embodiment 200 illustrates the valve 210 in a closed position, wherein no fluid may flow through the valve. The closed position may be a default position of the valve 210, wherein the spring 216 forces the piston 214 to a top of the valve 210. Additionally or alternatively, the spring 216 may force the piston 214 to the top of the valve 210 in response to an external condition being less than a threshold amount. The external condition may include one or more of a temperature, pressure, humidity, and the like. Herein, the external condition is pressure. As such, the spring 216 may be shaped and tensioned to respond to a pressure, such that when the pressure is equal to or greater than the threshold amount, the spring 216 may be compressed and the valve 210 may be moved to an open position, as shown in FIG. 2B. As such, the pressure may overcome the force of the spring 216. As will be described herein, the valve 210 comprises features catered to distributing the pressure evenly to a surface of the piston 214 such that hysteresis between open and closed positions of the valve 210 is eliminated.

The valve 210 comprises at least one inlet 222, which may be arranged symmetrically along a central axis 292 of the valve 210. The central axis 292 may be parallel to an axis about which the piston 214 oscillates. The inlet 222 may be circular, square, or some other shape. Herein, the inlet 222 is circular and comprises an inlet diameter 224.

The valve 210 further comprises a plurality of outlets 230. More specifically, the plurality of outlets 230 may include a first outlet 232 and a second outlet 236. The first outlet 232 and the second outlet 236 may be substantially identical in size and shape. A first outlet width 234 may be equal to a second outlet width 238. Herein, the first and second outlet widths 234, 238 are first and second outlet diameters 234, 238. The first and second outlet diameters 234, 238 may be less than the inlet diameter 224. In one example, a sum of the first and second outlet diameters 234, 238 is equal to inlet diameter 224. As another example, a sum of the areas of the first and second outlets 232, 236 may be equal to an area of the inlet 222. In this way, an amount of fluid entering an interior volume 218 of the valve 210 may be equal to an amount of fluid exiting the interior volume 218.

The first outlet 232 and the second outlet 236 may be arranged directly across one another. In one example, the first outlet 232 and the second outlet 236 are arranged exactly opposite one another. In this way, the first outlet 232 and the second outlet 236 may be separated by 180° along an axis perpendicular to the central axis 292. By arranging the first and second outlets 232, 236 directly across from one another, a side load of the piston 214 may be balanced.

In some examples, the plurality of outlets 230 may include more than two outlets. For example, the plurality of outlets 230, may comprise three, four, five, six, seven, and so on numbers of outlets arranged symmetrically about the valve body 212. For example, if the plurality of outlets 230 comprises three outlets, then the outlets may be separated by 120°.

Based on the arrangement and shape of the inlet 222, the first outlet 232, the second outlet 236, the piston 214, the valve body 212, and the spring 216, the valve 210 may be completely rotationally and bilaterally symmetric about the central axis 292. By maintaining a symmetry of the valve 210, a pressure distribution across a surface of the piston 214 may be substantially uniform through a variety of positions and conditions of the valve 210, thereby decreasing hysteresis to zero.

The valve 210 may further comprise a vent 252 arranged distal to a valve seat 213 near a bottom of the valve 210. The vent 252 may be arranged below the piston 214 such that fluids flowing into the valve 210 may not flow through the vent 252. The valve 252 may allow breathing to occur in a spring chamber where the spring 216 is arranged during oscillation of the piston 214. Additionally, the vent 252 may function to discharge fluids that have leaked between the piston 214 and valve housing 212 to the spring chamber. In this way, the vent 252 may additionally function to mitigate a build-up of leaked fluids that may otherwise degrade functionality of the valve 210. The vent 252 may be fluidly coupled to an ambient atmosphere or may redirect fluids to a fluid source fluidly coupled to the inlet 222.

The valve 210 further comprises a protrusion 242 which may be arranged between the piston 214 and the valve seat 213. When the valve 210 is in the closed position, as shown in the example of FIG. 2A, the protrusion 242 may form a line contact with the valve seat. This line contact may allow a projected open surface area of the piston 214 in the closed position to be substantially equal to a projected open surface area of the piston 214 in the open position. As such, the protrusion 242 may be relatively firm, wherein a firmness of the protruding feature may be such that a force of the spring 216 may not compress the protrusion 242 when pressed against the valve seat 213.

Said another way, the protrusion 242 may maintain a distance 246 between the piston 214 and the valve seat 213 such that an effective area of the piston 214 to which pressure may be applied may be substantially equal in any position of the piston 214 (e.g., full closed, full open, or a position therebetween). In this way, the piston 214 may not move to a position within the distance 246 of the valve seat 213. As such, a distance equal to or greater than the distance 246 is constantly maintained between the valve seat 213 and the piston 214.

The protrusion 242 may comprise one or more materials including but not limited to carbon fiber, foam, silicon, plastic, and the like. The foam may be a high-density or a low-density foam comprising a desired firmness based on a stored energy of the spring 216. The plastic may be a hard-plastic.

The protrusion 242 further comprises spaces 244 and/or openings 244 and/or gaps 244 arranged between portions of the protrusion 242. In one example, the protrusion 242 comprises a first protrusion 242A and a second protrusion 242B symmetrically arranged on the piston 214 with gaps 244 arranged between extreme ends of each of the protrusions. The protrusion 242 and the gaps 244 are illustrated in greater detail below with respect to FIGS. 3A and 3B.

The gaps 244 may direct a fluid to evenly spread across a surface of the piston 214 to which the protrusion 242 is physically coupled, thereby allowing an entire piston surface to be substantially equal to an effective hydraulic area. As such, the valve seat 213 surface area may contribute zero impact on the effective hydraulic area, which would otherwise create an area differential in previous examples of valves, such as the valves described above. A combination of the first and second outlets 232, 236, the protrusion 242, and the gaps 244 may allow a valve inlet pressure to exert over an entire surface of the piston 214, even in the closed position. As the valve inlet pressure overcomes a force of the spring 216 and pushes the piston 214 down, zero change ensues in a hydraulic area on the piston 214, since the piston 214 may only form the line contact at the closed position. As a consequence, no hysteresis of pressures is generated between the open and closed positions of the valve 210, thereby enabling smooth operation of the valve 210 with minimal to zero noise, vibration, and harshness (NVH) issues.

Once the piston 214 is moved fully downward to a fully open position and the spring 216 is compressed, fluid, depicted by arrows 294, may flow through the inlet 222 and through the first and second outlets 232, 236 as shown in the example of FIG. 2B. In some examples, fluid flowing through the first and second outlets 232, 236 may flow to a single component (e.g., an engine). Additionally or alternatively, the first outlet 232 may be fluidly coupled to a first component and the second outlet 236 may be fluidly coupled to a second component different than the first. As such, the valve 210 may be further shaped to provide fluid to two different engine components. In this way, a number of outlets may be adjusted based on a number of components intended to receive the fluid. In some examples, the valve 210 may be used as a flow-diverter, wherein the valve 210 may split incoming fluid flow evenly or unevenly to two or more separate components.

Turning now to FIG. 3A, it shows a top-down view 300 of the piston 214 of a zero hysteresis valve (e.g., valve 210 of FIG. 2). The top-down view 300 illustrates an arrangement of the first protruding feature 242A and the second protruding feature 242B. The top-down view further illustrates an arrangement of the first and second protruding features 242A, 242B relative to a first gap 244A, a second gap 244B, and first and second outlets 232, 236.

As described above, the valve is completely symmetric with first and second outlets 232, 236 arranged directly across from one another along a horizontal axis. The first and second protrusions 242A, 242B may be arranged directly between the first and second outlets 232, 236 directly across from one another along the horizontal axis. In this way, when the piston 214 is in a position such that the first and second outlets 232, 236 and the first and second protrusions 242A, 242B are at equal height, then each of the first and second outlets 232, 236 and the first and second protrusions 242A, 242B may be aligned about the horizontal axis.

The first and second protrusions 242A, 242B may be substantially identical in shape and size. The first and second protrusions 242A, 242B may be arc-shaped, wherein the arc of the protrusions may follow a profile of the piston 214. That is to say, a distance between an edge and/or a perimeter of the piston 214 to the first or second protrusion 242A, 242B, may be uniform.

First gap 244A may be arranged between a first pair of adjacent extreme ends of the first and second protrusions 242A, 242B. Similarly, the second gap 244B may be arranged between a second pair of adjacent extreme ends, different than the first pair, of the first and second protrusions 242A, 242B. The first and second gaps 244A, 244B may be similarly sized and shaped. The first and second gaps 244A, 244B may be shaped to adjust a force exerted onto the piston 214. In one example, the first and second gaps 244A, 244B are shaped to uniformly distribute the force along the surface of the piston 214 to eliminate hysteresis. In this way, the first and second gaps 244A, 244B may be shaped to direct fluid and/or pressure from a position radially interior of the first and second protrusions 242A, 242B to radially exterior positions, or vice-versa.

Turning now to FIG. 3B, it shows a perspective view 350 of the piston 214 and the first and second protrusions 242A and 242B. The first protrusion 242A and the second protrusion 242B may be curved, half-cylinders spaced away from a circumference and/or edge and/or perimeter of the piston 214. The first and second protrusions 242A, 242B may comprise a first external radius, r1, and a second external radius, r2. The second external radius, r2, is greater than the first external radius, r1, wherein each of the radii are measured from a center of the piston 214. In one example, a central axis, such as central axis 292 of FIG. 2, may pass directly through the center of the piston 214.

The first external radius, r1, may be measured from the center of the piston 214 to an inner edge of the first or second protrusion 242A, 242B. The second external radius, r2, may be measured from the center of the piston 214 to an outer edge of the first or second protrusion 242A, 242B. A difference between the second external radius, r2, and the first external radius, r1, may be equal to a width of the first and second protrusions 242A, 242B.

In some examples, additionally or alternatively, the first and second external radii, r1 and r2, may be based on a diameter 352 of the piston 214. In first and second external radii, r1 and r2, may be equal to a value between 10 to 45% of the diameter 352 of the piston 214. In some examples, additionally or alternatively, the first and second external radii, r1 and r2, may be between 35 to 45% of the diameter 352.

A height 354 of the first and second protrusions 242A, 242B may be correspond to a radius of a cylinder from with the first and second protrusions 242A, 242B are shaped. Additionally or alternatively, the height 354 may be substantially equal to half the difference of the first and second external radii, r1 and r2. That is to say, the difference between the first and second external radii, r1 and r2, may correspond to a diameter of the cylinder, wherein the first and second protrusions 242A, and 242B are shaped similar to half of the cylinder, wherein the half-cylinder is curved to match a curvature of the piston 214.

The height 354 of the first and second protrusions 242A, 242B may be fixed. In one example, the height 354 does not change. As such, as the piston 214 oscillates along an axis (e.g., central axis 292 of FIG. 2), the height 354 may remain constant, even when in contact with a valve seat of the valve (e.g., valve seat 213 of valve 210 of FIG. 2). Thus, the height 354 may be substantially equal to the threshold distance (e.g., distance 246 of FIG. 2) maintained between the piston 214 and the valve seat.

A gap width 356 may be measured from adjacent extreme ends of the first and second protrusions 242A, 242B. The gap width 356 may be equal for each of the first and second gaps 244A, 244B. The gap width 356 may be fixed due to the first and second protrusions 242A, 242B being immovable.

FIGS. 2, 3A, and 3B show one embodiment of the valve comprising a moveable portion with a protrusion physically coupled thereto. Therein, the protrusion is separated into two pieces with gaps arranged therebetween. However, it will be appreciated that other shapes and arrangements of the protrusion may be arranged on the moveable portion of the valve without departing from the scope of the present disclosure. The protrusions are curved to mimic a curve of the moveable portion to maintain symmetry. Likewise, the gaps may be similarly curved to maintain symmetry of the valve to at least partially avoid pressure imbalances across a surface of the moveable portion.

The protrusions may be semi-cylindrical, wherein a flat side of the semi-cylinder is physically coupled to and in face-sharing contact with a surface (e.g., an upper surface) of a moveable portion. The protrusions may function to prevent contact between the surface of the moveable portion and a valve seat of the valve. In one example, the protrusions maintain at least a minimum distance substantially equal to a height of the protrusions between the valve seat and the moveable portion. It will be appreciated that dimensions of the protrusions, gaps, an inlet of the valve, and outlets of the valve may be adjusted based on pressures associated with a system in which the valve is arranged. For example, if a first system typically experiences pressures higher than a second system, then a valve arranged in the first system may comprise outlets having an increased diameter, protrusions having an increased height, and gaps having an increased arc length greater than a valve arranged in the second system.

A profile of the protrusions and gaps may be substantially circular, wherein the circle of the protrusions and gaps may comprise a circumference less than a circumference of the moveable portion. The gaps are arranged directly across from one another along an axis perpendicular to both a central axis of the valve along with the piston oscillates and an axis along which the outlets are arranged. In examples of the valve where more than two outlets are arranged, the gaps may be arranged such that they do not align with any of the outlets. In this way, the gaps may be radially misaligned with outlets of the valve. In some examples, the gaps may be radially aligned with at least some of the outlets of the valve.

Turning now to FIG. 4, it shows a plurality of cross-sections of different protrusion shapes. In the embodiment 400, the cross-section is a half-circle and/or half-cylinder. As such, the embodiment 400 may be a cross-section of the protrusion illustrated in FIGS. 2, 3A, and 3B.

In the embodiment 410, the cross-section of the protrusion is bullet-shaped. As such, an entire base of the bullet may contact the valve seat when the valve is in the fully closed position, such as the position shown in FIG. 2.

In the embodiment 420, the cross-section of the protrusion is triangle-shaped. As such, a tip or a side of the triangle may contact the valve seat when the valve is in the fully closed position, such as the position shown in FIG. 2. Additionally or alternatively, a tip of the triangle may be blunted, as shown by dashed tip 422 to mitigate a concentration of mechanical stress occurring onto the protrusion.

In the embodiment 430, the cross-section of the protrusion is trapezoid-shaped. As such, an entire side of the trapezoid may contact the valve seat when the valve is in the fully closed position, such as the position shown in FIG. 2.

In the embodiment 440, the cross-section of the protrusion is chevron-shaped and/or arrow-shaped. As such, an entire side or a tip of the chevron may contact the valve seat when the valve is in the fully closed position, such as the position shown in FIG. 2. Additionally or alternatively, a tip of the chevron may be blunted, as shown by dashed tip 442 to mitigate a concentration of mechanical stress occurring onto the protrusion.

In the embodiment 450, the cross-section of the protrusion is pentagon-shaped. As such, an entire side or a corner of the pentagon may contact the valve seat when the valve is in the fully closed position, such as the position shown in FIG. 2. Additionally or alternatively, a tip of the pentagon may be blunted, as shown by dashed tip 452 to mitigate a concentration of mechanical stress occurring onto the protrusion.

In some examples, additionally or alternatively, the protrusion may be a single, continuous ring. However, to allow fluid to flow radially inward and radially outward of the protrusion, the protrusion may comprise a plurality of passages extending through its body. In this way, portions of the protrusion physically coupled to the moveable portion of the valve may be separated by a passage of the plurality of passages. Said another way, each passage of the plurality of passages may alternate with portions of the protrusion physically coupled to the moveable portion.

In some embodiments, additionally or alternatively, there may be more than two protrusions and more than two gaps. For example, there may be three, four, five, six, seven, or more of the protrusions and the gaps. The protrusions and gaps may alternate with one another such that a symmetry of the valve is maintained and no two protrusions are touching.

In this way, a valve may comprise features which are shaped to eliminate hysteresis between open and closed positions. The features include arranging opposing valve outlets and a pair of semi-cylindrical protrusions on a piston surface. The technical effect of incorporating these features with a valve is to maintain an effective pressure area of the piston during all positions of the valve. By doing this, valve operation may be more smooth and noise emanating from the valve may be eliminated.

An embodiment of a valve comprising a piston shaped to oscillate within a valve housing, wherein a protrusion is physically coupled to the piston and shaped to prevent the piston from moving within a threshold distance of a valve seat. A first example of the valve further includes where the valve housing comprises a single inlet arranged symmetrically along a central axis along which the piston oscillates. A second example of the valve, optionally including the first example, further includes where the valve housing comprises a first outlet and a second outlet arranged directly opposite one another along an axis perpendicular to the central axis. A third example of the valve, optionally including the first and/or second examples, further includes where the protrusion is a first protrusion, and where a second protrusion is physically coupled to the piston. A fourth example of the valve, optionally including one or more of the first through third examples, further includes where the first protrusion and the second protrusion are identical. A fourth example of the valve, optionally including one or more of the first through fourth examples, further includes where gaps separate the first and second protrusions, and where the valve is completely symmetric about its central axis.

An embodiment of a system comprising a pressure control device comprising a moveable portion shaped to adjust flow of a fluid through an inlet and a plurality of outlets, the pressure control device further comprising one or more protrusions physically coupled to a top of the moveable portion, and where the pressure control device is symmetric. A first example of the system further includes where the protrusions include a first protrusion and a second protrusion, and where the first and second protrusions are arranged directly across one another and radially inward relative to the plurality of outlets. A second example of the system, optionally including the first example, further includes where the first and second protrusions are impervious to fluid flow, and where gaps are arranged between and separated the first and second protrusions, and where fluid flows through the gaps. A third example of the system, optionally including the first and/or second examples, further includes where the one or more protrusions includes only a single protrusion, and where the protrusion is discontinuously coupled to the piston, and where spaces exist at portions of the protrusion not physically coupled to the piston for flowing fluid. A fourth example of the system, optionally including one or more of the first through third examples, further includes where the one or more protrusions maintain a minimum distance between the piston and a valve seat of the pressure control device. A fifth example of the system, optionally including one or more of the first through fourth examples, further includes the one or more protrusions only contact a valve seat via an apex and do not compress in response to contacting the valve seat. A sixth example of the system, optionally including one or more of the first through fifth examples, further includes a first effective hydraulic area of the piston in a closed position is equal to a second effective hydraulic area of the piston in an open position. A seventh example of the system, optionally including one or more of the first through sixth examples, further includes the pressure control device maintains zero hysteresis between its opening and closing. An eighth example of the system, optionally including one or more of the first through seventh examples, further includes the pressure control device is included in one or more of an engine, a transmission, and a driveline.

An embodiment of a method comprising closing a valve by applying a first pressure evenly to a first effective area of a piston of the valve and opening the valve by applying a second pressure evenly to a second effective area of the piston, where the first and second effective areas are exactly identical; wherein the piston further comprises a first protrusion and a second protrusion physically coupled to a top surface of the piston, and where the first protrusion and the second protrusion are separated by first and second gaps shaped to flow a fluid between the first and second protrusions. A first example of the method further includes where the fluid enters the valve via a single inlet, flows evenly across the top surface of the piston, and exits the valve via a first outlet and a second outlet. A second example of the method, optionally including the first example, further includes where the first outlet and the second outlet are arranged 180° apart from one another, and where the valve is symmetric about a central axis parallel to a direction of motion of the piston. A third example of the method, optionally including the first and/or second examples, further includes where the first protrusion and the second protrusion are rigid and do not recoil in response to the piston moving to a closed position where the first and second protrusions contact a valve seat of the valve. A fourth example of the method, optionally including one or more of the first through third examples, further includes where the first and second protrusions are half-cylinders, curved to match a curve of the piston.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A valve, comprising:
   a piston which oscillates within a valve housing between an open position and a closed position,
   a first protrusion and a second protrusion extending from a face of the piston and contacting a valve seat which prevents the piston face from moving within a threshold distance of the valve seat, and where the first protrusion and the second protrusion are separated by first and second gaps which flow fluid between the first and second protrusions, and the protrusions are rounded or pointed on an end which contacts a valve seat, and
   a cross-sectional shape of the protrusions is narrower at a distal end which contacts the valve seat than at a base end formed on the face of the piston, wherein fluid exits via a first outlet and a second outlet arranged 180° apart from one another, and the gaps are arranged 180° apart from one another and rotated 90° from the first and second outlets.

2. The valve of claim 1, wherein the first protrusion and the second protrusion are identically shaped, and where the shape of the first and second protrusions is a semi-cylinder having a flat side in face-sharing contact with a top side of the piston, and where a half-circle extends from the flat side, a curved portion of the half-circle contacting the valve seat without compressing, and where the first and second protrusions are curved to match a curve of a circumference of the piston.

3. The valve of claim 1, wherein line contact between the narrower distal end of the protrusions and the valve seat reduces a difference in exposed surface area between an open and closed position of the valve.

4. The valve of claim 1, wherein the protrusions form line contact with the valve seat when the valve is in a closed position, and
wherein the line contact reduces hysteresis through a fully closed position, a fully open position, and positions therebetween.

5. The valve of claim 1, wherein a height of the piston is sized such that the piston blocks the first outlet and the second outlet when the valve is in a closed position, and the outlets of the valve become unblocked when the protrusions break contact with the valve seat.

6. A system, comprising:
a pump;
a pressure control device positioned downstream of the pump and comprising a moveable piston adjusting flow of a fluid through an inlet and a plurality of outlets,
the piston blocking the plurality of outlets when the valve is in a closed position, and unblocking the outlets when one or more a first protrusion and a second protrusion breaks contact with the valve seat, and
the protrusions physically coupled to a top of the moveable portion, and where the pressure control device is symmetric, and where the first and second protrusions are separated by first and second gaps which flow fluid between the first and second protrusions, and the protrusions are rounded or pointed on an end which contacts a valve seat,
wherein fluid exits via a first outlet and a second outlet arranged 180° apart from one another, and the gaps are arranged 180° apart from one another and rotated 90° from the first and second outlets.

7. The system of claim 6, wherein the one or more are pointed or rounded on an end which contacts the valve seat and are radially inward relative to the plurality of outlets.

8. The system of claim 7, wherein the first and second protrusions are impervious to fluid flow.

9. The system of claim 7, wherein the pointed or rounded surface forms line contact with the valve seat, and the protrusions do not compress in the closed position in the valve to maintain line contact between the protrusions and the valve seat.

10. The system of claim 6, wherein the protrusions maintain a minimum distance between the piston and a valve seat of the pressure control device and the minimum distance is sized such that the piston unblocks the outlets when the protrusions break contact with the valve seat.

11. The system of claim 6, wherein the protrusions form line contact with the valve seat and do not compress to maintain line contact between the protrusions and the valve seat when the valve is in the closed position.

12. The system of claim 6, wherein an effective hydraulic area of the piston exposed to vapor in a closed position is equal to an effective hydraulic area exposed to vapor of the piston in an open position, and the equal hydraulic areas reduce hysteresis through a fully closed position, a fully open position, and positions therebetween.

13. The system of claim 6, wherein the pressure control device is included in one or more of an engine system, a transmission system, and a driveline.

14. A method, comprising:
closing a valve by applying a first pressure evenly to a first effective area of a piston of the valve; and
opening the valve by applying a second pressure evenly to a second effective area of the piston;
wherein the piston further comprises a first protrusion and a second protrusion physically coupled to a top surface of the piston, and where the first protrusion and the second protrusion are separated by first and second gaps which flow a fluid between the first and second protrusions, and the protrusions are rounded or pointed on an end which contacts a valve seat; and
wherein fluid exits via a first outlet and a second outlet arranged 180° apart from one another, and the gaps are arranged 180° apart from one another and rotated 90° from the first and second outlets.

15. The method of claim 14, wherein the fluid enters the valve via a single inlet, flows evenly across the top surface of the piston.

16. The method of claim 14, wherein the first protrusion and the second protrusion are rigid and do not recoil in response to the piston moving to a fully closed position where the first and second protrusions contact a valve seat of the valve to maintain line contact between the protrusion and valve seat.

17. The method of claim 14, wherein the first and second protrusions are half-cylinders with a narrow curved end contacting the valve seat.

* * * * *